(12) United States Patent
Tomatis et al.

(10) Patent No.: US 8,879,535 B2
(45) Date of Patent: Nov. 4, 2014

(54) PSS DETECTION PROCESS FOR AN LTE COMMUNICATION NETWORK

(75) Inventors: Fabrizio Tomatis, Saint Laurent du Var (FR); Issam Toufik, Juan les pins (FR)

(73) Assignees: ST-Ericsson SA, Plan-les-Ouates (CH); ST-Ericsson (France) SAS, Grenoble (FR)

( * ) Notice: Subject to any disclaimer, the term of this patent is extended or adjusted under 35 U.S.C. 154(b) by 424 days.

(21) Appl. No.: 13/318,539

(22) PCT Filed: May 4, 2010

(86) PCT No.: PCT/EP2010/002726
§ 371 (c)(1),
(2), (4) Date: Feb. 3, 2012

(87) PCT Pub. No.: WO2010/127832
PCT Pub. Date: Nov. 11, 2010

(65) Prior Publication Data
US 2012/0307820 A1     Dec. 6, 2012

(30) Foreign Application Priority Data
May 5, 2009   (EP) .................................. 09368012

(51) Int. Cl.
*H04J 3/06* (2006.01)
*H04B 1/7075* (2011.01)
*H04B 1/7083* (2011.01)

(52) U.S. Cl.
CPC .......... *H04B 1/70755* (2013.01); *H04B 1/7083* (2013.01)
USPC ....................................................... 370/350

(58) Field of Classification Search
USPC ......................................... 370/350, 252, 329
See application file for complete search history.

(56) References Cited

U.S. PATENT DOCUMENTS

| 8,170,592 B2* | 5/2012 | Swarts et al. ................. 455/502 |
| 8,331,331 B2* | 12/2012 | Luo ............................... 370/336 |
| 2003/0117979 A1 | 6/2003 | Chitrapu |
| 2010/0182903 A1* | 7/2010 | Palanki et al. ................ 370/225 |

FOREIGN PATENT DOCUMENTS

| EP | 1 093 237 A2 | 4/2001 |
| WO | 2008044204 A2 | 4/2008 |

OTHER PUBLICATIONS

International Search Report in corresponding PCT Application No. PCT/EP2010/002726 mailed Sep. 28, 2010.
Written Opinion of the International Searching Authority in corresponding PCT Application No. PCT/EP2010/002726 mailed Sep. 28, 2010.

(Continued)

*Primary Examiner* — Mohammad Anwar
(74) *Attorney, Agent, or Firm* — Patent Portfolio Builders PLLC

(57) ABSTRACT

Cell detection process for a communication network, such as a Long Term Evolution (LTE) system; comprising the steps of: receiving signal samples (i.e. OFDM samples in the case of LTE) transmitted by at least one Base Station (BS); performing a first Primary Synchronization Signal (PSS) correlation measurement with a predetermined PSS sequence in order to generate a first PSS correlation measurement sequence; performing a second Primary Synchronization Signal (PSS) correlation measurement in order to generate a second PSS correlation measurement sequence; comparing said first and second correlation measurement sequences with a predetermined threshold in order to determine peak values, determining common peak values substantially corresponding to similar locations within the half radio frame, and identifying the PSS corresponding to said common peak positions.

13 Claims, 4 Drawing Sheets

(56) References Cited

OTHER PUBLICATIONS

International Preliminary Report on Patentability in corresponding PCT Application No. PCT/EP2010/002726 mailed Nov. 17, 2011.

Ericsson, "3rd Generation Partnership Project; Technical Specification Group Radio Access Network; Evolved Universal Terrestrial Radio Access (E-UTRA); Physical Channels and Modulation (Release 8)" 3GPP TS 36.2611, V8.6.0, Mar. 2009, entire document.

* cited by examiner

PSS DETECTION PROCESS FOR AN LTE COMMUNICATION NETWORK

TECHNICAL FIELD

The invention relates to the field of wireless digital communications and more particularly to Cell detection, physical-layer cell identity (Cell ID) identification and to initial synchronization process for a Long Term Evolution communication system.

BACKGROUND ART

The present invention relates to the LTE (Long Term Evolution) wireless communication system defined by the 3GPP standardization committee and included in the so called Release8 specification. Long Term Evolution (LTE) corresponds to the more recent development in wireless cellular communications, following the High Speed Downlink Packet Access HSDPA and High Speed Uplink Packet Access (HSUPA).

The mechanism of cell detection in LTE is based on the use of the so-called Primary Synchronization Signal (PSS) which is one of the two synchronization signals—namely the primary synchronization signal (PSS) and the secondary synchronization signal (SSS). The identification of the indices of the PSS and SSS sequences transmitted by the base station allows achieving the physical layer Cell ID detection.

The PSS signal is a signal which is based on the use of ZC sequences showing interesting correlation properties, and is periodically transmitted each 5 ms (i.e. half a radio frame) by a cell or a base station over six resource blocks comprising 72 central sub-carriers independently of the transmission bandwidth.

It is received by the User Equipment (UE) for detecting the initial timing and might be used for computing the strength of the signal. One may refer to document 3GPP TS 36.211, "Physical Channels and Modulation", V8.6.0, 17 Mar. 2009.

As known by a skilled man, the aim of this synchronization signal is to ensure coarse time and frequency synchronization of the User-Equipment (UE), allowing the latter to obtain the slot timing and to acquire the carrier frequency and a part of the cell-identity within a physical-layer cell-identity group.

Once the PSS signal has been detected, the UE proceeds with additional processing including the detection of the SSS allowing completion of the synchronization process and the detection of the start of the frame as well as the other part of the cell ID i.e. the physical-layer cell-identity group.

A proper detection of the PSS shows to be a critical operation in order to avoid unnecessary waste of time, power and digital processing resources to be consumed in the case of false detections.

Typical PSS detection procedure consists of the cascade of:

1) Correlation with PSS time domain sequences and accumulation: This step comprises the computation of the correlation of the received signal with respect to known PSS time sequences for all timing samples within a LTE radio frame and eventually accumulation over a set of half radio frames, i.e. duration of 5 ms, (or a integer multiples of this duration) to improve the sensitivity.

2) Constant-False-Alarm-Rate (CFAR) selection: consisting in applying a threshold to the correlation values. The threshold is determined in function of the estimate of the noise variance and of a target False-Alarm-Rate (FAR). Such method has the drawback of showing a high CFAR for a given PSS detection probability.

As known by the skilled man, there is a clear trade-off between the noise selectivity (low FAR) and the PSS signal detection probability. A higher threshold may reduce the occurrence of false alarms due to noise peaks, but has unfortunately the drawback of reducing probability of detection of the true PSS peaks.

The existence of these un-wanted detections due to noise results in a large amount of peaks that need to be further processed by the common LTE cell-search and synchronization physical procedure consisting in Secondary-Synchronization Signal (SSS) detection, to acquire the physical-layer cell-identity group and the Radio frame boundary. It is clear that false-alarms constitute the cause of energy wastage especially for idle-mode UE operations, thus resulting in a significant shortening of the battery life.

Therefore, there is a clear need for an improved technique for reducing the overall quantity of false alarms while maintaining at a reasonable and acceptable level the probability of detection of true PSS peaks.

SUMMARY OF THE INVENTION

It is a first object of the present invention to provide an effective method for detecting a synchronization signal in a digital communication system complying the LTE standard.

It is a further object of the present invention to provide a method for detecting the Primary Synchronization Signal (PSS) for LTE which does not require the preliminary knowledge of the channel characteristics.

It is another object of the present invention to provide an efficient, but still simple, process for improving the cell searcher performance required for the initial synchronization to a serving cell and for neighboring cells tracking.

It is still a further object of the present invention to provide a detection process achieving a low CFAR for the same PSS detection probability, resulting in less detection of false peaks and thus less power consumption.

These and other objects of the invention are achieved by means of Cell detection process which comprises the steps of:
 receiving a signal (OFDM symbols) transmitted by at least one Base Station (BS);
 performing a first Primary Synchronization Signal (PSS) correlation measurement of the received signal with a predetermined PSS sequence in order to generate a first PSS correlation measurement sequence;
 performing a second Primary Synchronization Signal (PSS) correlation measurement in order to generate a second PSS correlation measurement sequence;
 comparing said first and second correlation measurement sequences with a predetermined threshold in order to determine peak values;
 determine common peak values, within the two measurements, substantially corresponding to similar locations within the half radio frame, and
 identifying the PSS corresponding to said common peak positions.

Preferably, the first and second correlation measurement sequences are being respectively accumulated during a period corresponding to N half radio frames (or N/2 radio frames) before being compared to said threshold.

In one embodiment, the first and second PSS correlation measurements are performed consecutive in time thus reducing the amount of digital processing resources being required.

Alternatively, the correlation measurements are performed on the signals received from two distinctive antennas and the first and second PSS correlation measurements are simultaneously performed on each streams received by one corresponding antenna. Although this embodiment requires more digital processing resources, the PSS detection is significantly improved for the same acquisition time or equivalently the acquisition time is reduced for the same PSS detection probability.

Alternatively, also more than two correlation measurements can be used in a similar way. These measurements can be performed consecutive in time, from different antennas or combination of time consecutive measurements and measurements from different antennas.

The invention also achieves a Receiver for a LTE telecommunication network and a mobile telephone comprising a receiver including:
  means for receiving signal samples (OFDM samples in the case of LTE) transmitted by at least one Base Station (BS);
  means for performing a first Primary Synchronization Signal (PSS) correlation measurement of the received signal with a predetermined PSS sequence in order to generate a first PSS correlation measurement sequence;
  means for performing a second Primary Synchronization Signal (PSS) correlation measurement in order to generate a second PSS correlation measurement sequence;
  means for comparing said first and second correlation measurement sequences with a predetermined threshold in order to determine peak values;
  means for determining common peak values substantially corresponding to similar locations within the half radio frame (or radio frame), and
  means for identifying the PSS corresponding to said common peak positions.

DESCRIPTION OF THE DRAWINGS

Other features of one or more embodiments of the invention will best be understood by reference to the following detailed description when read in conjunction with the accompanying drawings.

DESCRIPTION OF THE PREFERRED EMBODIMENT

We now describe a method for achieving detection of the Primary Synchronization Signal (PSS) which is to be detected prior to the detection of the Secondary Synchronization Signal (SSS).

In the embodiment, it will be considered the use of the PSS being carried on a set of six resource blocks including 72 sub-carriers and transmitted periodically by a cell each 5 ms (i.e. each half radio frame). It should be noticed that those figures are only given as an example and that the process may be easily adapted to a different set of subcarriers.

Figure 1:
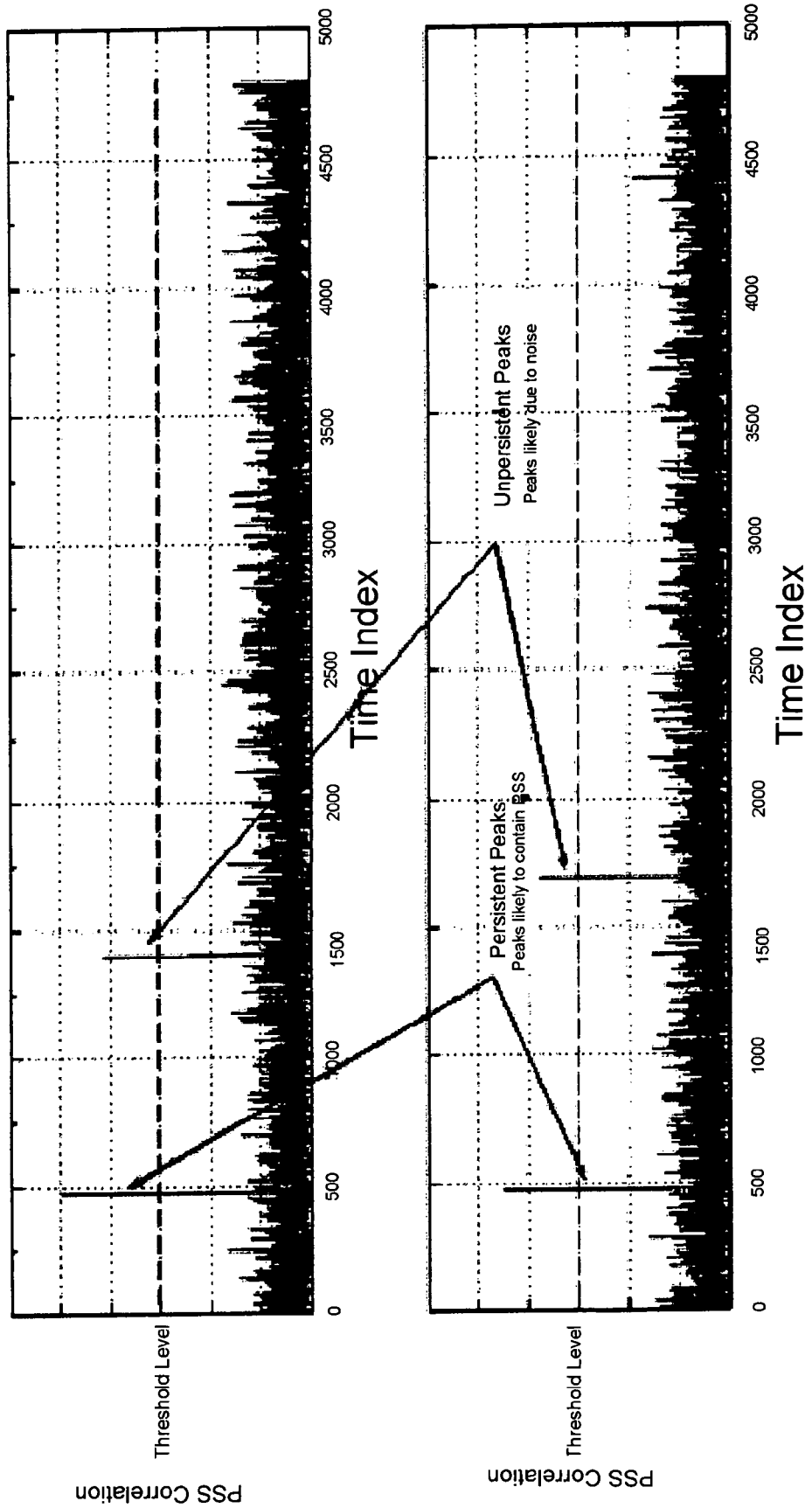
FIG. 1 illustrates the detection of persistent peaks in the frame.

With respect to FIG. 1, there is illustrated the general principle of the detection method. In the first PSS correlation measurement (First plot), two peaks exceed the fixed threshold. When comparing these peaks with those exceeding the threshold in the second PSS correlation measurement (Second Plot), we notice that the first peak is persistent in the same time index (double-detected) and thus is likely to contain a PSS. Thus a SSS search will be performed in the position corresponding to this peak. The other peaks are not persistent and thus are more likely to be noise peaks. No SSS search is performed for those peaks.

The double detection mechanism can be performed on different PSS correlation measurements:
  Two successive half radio-frames correlations,
  Two successive accumulations of half radio-frames (or radio frames) correlations
  or on PSS correlation measurements made in different receiving antennas of the UE.

Figure 2:
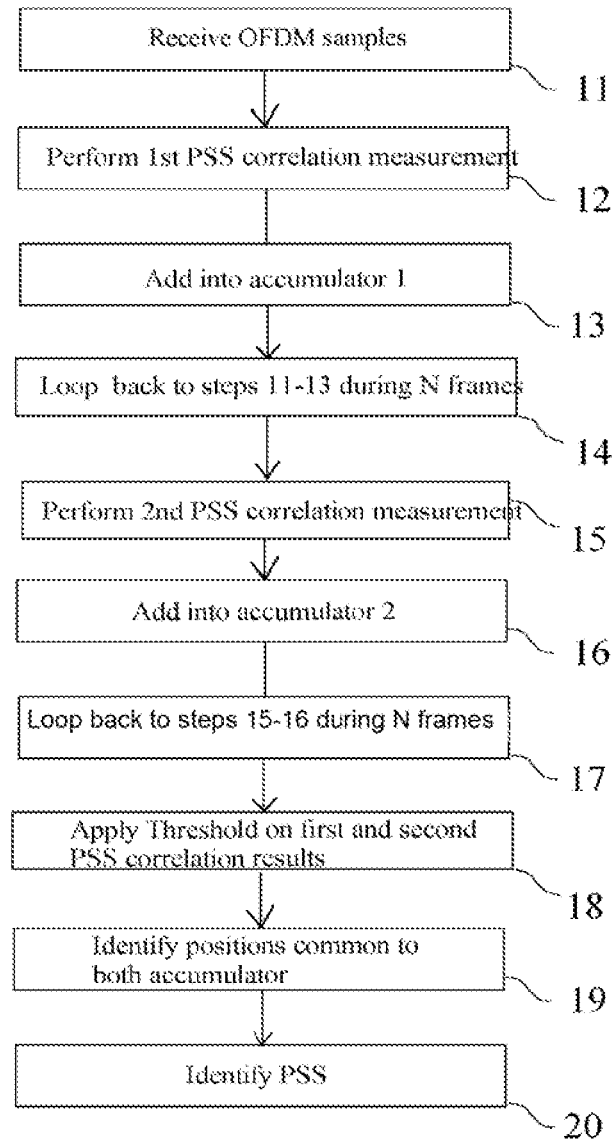
FIG. 2 illustrates the flow chart of the process used in a first embodiment of the present invention.

With respect to FIG. 2, there is now described a first embodiment of the inventive process which successively process the signal received by one single antenna.

The process starts with a step 11 which is the receiving of the signal samples. As known by the skilled man, the samples spanning a duration of 5 ms—comprises both data and one synchronization signal. Step 11 particularly can involve a filtering step in order to focus on the synchronization information which is conveyed through a predefined set of sub-carriers, i.e. a set of six resources blocks comprising 72 carriers located at the center of the bandwidth. This is not mandatory but it helps improve the detection performance.

Then, in a step 12, a first PSS correlation measurement computation is performed in order to produce a first PSS correlation measurement sequence of a duration of half a radio frame. It should be noticed that different calculations and algorithms may be considered in that respect. In one embodiment, the correlation is computed by means of consecutive multiplication-addition of the different elements of the received samples with the conjugate of the considered PSS candidate.

The process then comprises two optional steps 13 and 14.

In a step 13, the process proceeds with the addition of the result of step 12 into a first accumulator ACC1.

In a step 14, the process loops back to steps 11-13 in order to perform a set of N accumulations over a period of N half radio frames.

Then, in a step 15, a second PSS correlation measurement computation is performed in order to produce a second PSS correlation measurement sequence of the same duration (i.e. 5 ms=half radio frame).

Similarly as for steps 13-14, steps 16-17 are optional steps which are used for accumulating the results of the second PSS correlation measurement into a second Accumulator ACC2 during a period of N half radio frames.

Then, in a step 18, a thresholding is applied on the result of the first and second PSS correlation measurement sequences or, when steps 13-14 are applied, on the results stored into the accumulators ACC1 and ACC2.

Then, in a step 19, the process proceeds with the identification of common positions corresponding to persistent peaks in the results of the PSS correlation measurements. It should be noticed that, in one embodiment, the identification of common positions may use a predefined windows in order to keep peaks corresponding to closely related positions within the half radio frame in order to take into consideration possible fading.

The process then completes with a step 20 that corresponds to the last step of the PSS detection process which finally returns the identification of the PSS position being transmitted by the base station.

Once the PSS detection is achieved, additional process can now be considered such as, as known by the skilled man, an appropriate Fast Fourrier Transform (FFT) processing for generating the OFDM symbol in the frequency domain.

The process which was described above results in a significant reduction of the detected PSS. This is a clear advantage with respect to the PSS searching mechanisms of the prior art which result in an unknown maximum number of found peaks including both true PSS signal and noise peaks, thus resulting in additional processing (Secondary Synchronization Signal search) be performed wasting time, computational power and energy.

Figure 3:
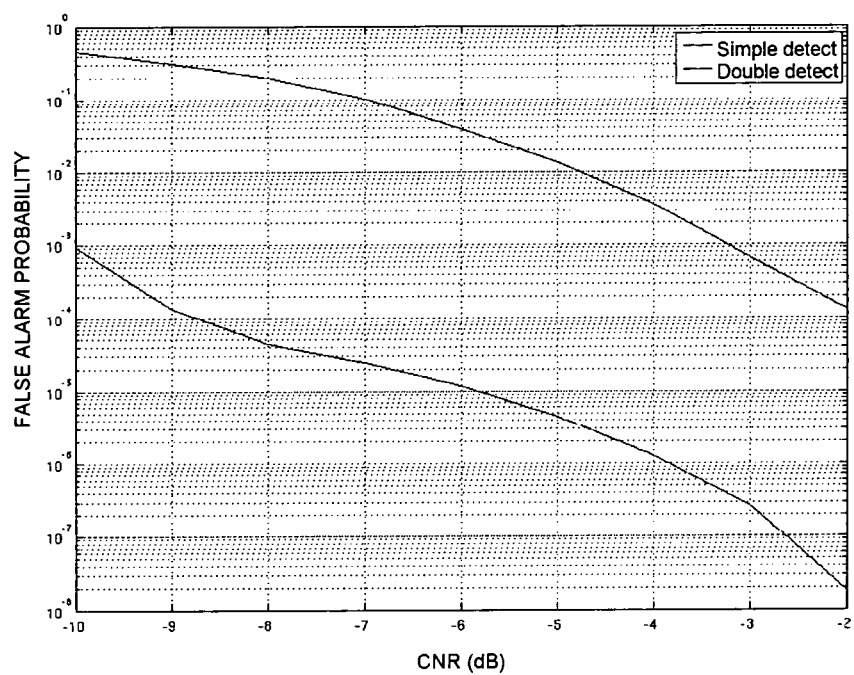
FIG. 3 illustrates the false alarm detection probability comparison between present detection (called double detection) mechanism and a method based only on a threshold (pure CFAR).

With respect to FIG. 3, there is illustrated the false alarm detection probability comparison between double detection mechanism and method based only on a threshold (pure CFAR).

Those results are obtained for a correct detection probability of the PSS of 95% for both methods. One may noticed the significant gain on CFAR offered by the process being invented, and thus allowing a huge power saving (Decrease of the SSS unnecessary decoding stages).

The process which was described can be advantageously applied to the OFDM samples received by one antenna of the LTE receiver comprising the means for performing the corresponding method.

Figure 4:
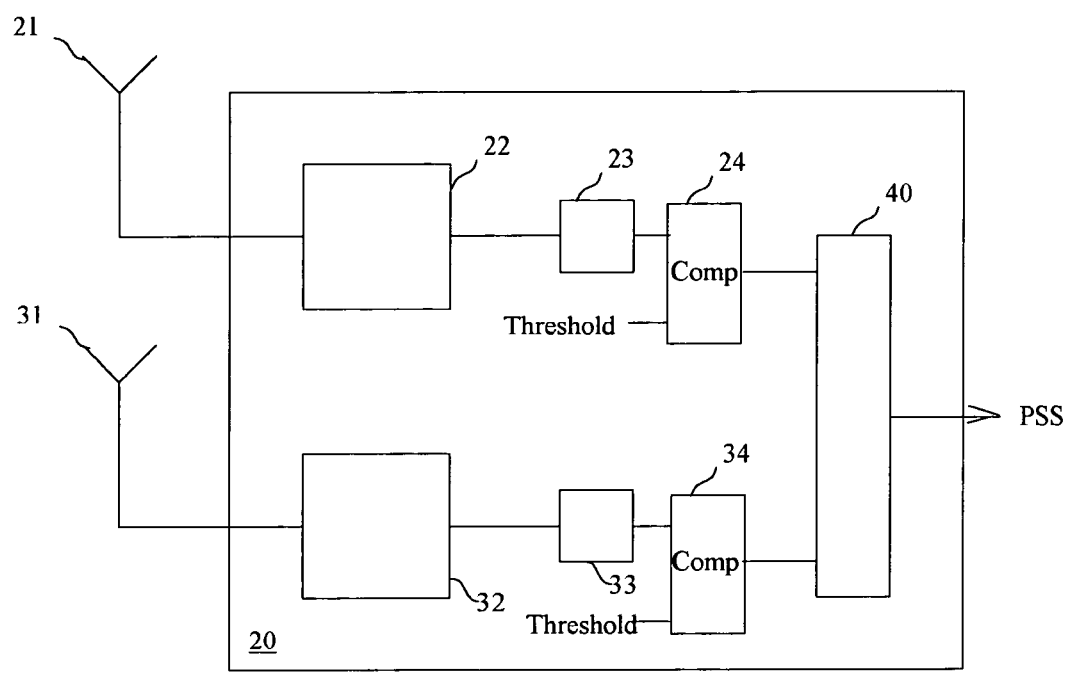
FIG. 4 illustrates the general function blocks of an alternative embodiment of the invention.

With respect to FIG. 4, there is illustrated the different blocks which are combined in a second alternative embodiment of a LTE receiver 20 comprising a first antenna 21 and a second antenna 31, associated with corresponding receiving circuits 22 and 32. It should be noticed that, for the sake of clarity, the RF circuit and the conventional receiving circuits well known to the skilled man have not been illustrated.

The LTE receiver further includes a first correlation block 22 which performs a first Primary Synchronization Signal (PSS) correlation measurement with a predetermined PSS sequence in order to generate a first PSS correlation measurement sequence.

Similarly, receiver 20 includes a second correlation block 22 which performs a second Primary Synchronization Signal (PSS) correlation measurement with a predetermined PSS sequence in order to generate a second PSS correlation measurement sequence.

It can be seen that, in contrary to the process described in the first arrangement, the LTE receiver of FIG. 4 allows simultaneously computing of the first and second PSS correlation measurements sequences, thus increasing the accuracy of the detection process.

Optionally, receiver 20 includes a first and a second accumulator, respectively 23 and 33, for accumulating the result of the first and second PSS correlation measurements during a period of N half radio frames.

Receiver 20 further includes a set of two comparators, respectively 24 and 34 for comparing the result of the PSS correlation measurements, or respectively accumulated into ACC1 and ACC2, in order to determine the candidate PSS peaks.

The two comparators issue the respective output positions within the half radio frame which are then forwarded to a another functional block 40 which compares the respective position of the detected PSS within the half radio frame and, should such positions be substantially the same, the corresponding PSS peaks will be reported as being true PSS signals.

In one embodiment, block 40 uses a predefined window for eliminating PSS peaks having no counterpart in the two blocks 24-34 within said window. Therefore, all peaks corresponding to isolated peaks reported by block 24 and 34 can be eliminated.

The invention claimed is:

1. A cell detection process for a communication network, such as a Long Term Evolution (LTE) system, the process comprising:
    receiving signal samples transmitted by at least one Base Station (BS);
    performing a first Primary Synchronization Signal (PSS) correlation measurement with a predetermined PSS sequence in order to generate a first PSS correlation measurement sequence;
    performing a second Primary Synchronization Signal (PSS) correlation measurement in order to generate a second PSS correlation measurement sequence;
    comparing said first and second PSS correlation measurement sequences with a predetermined threshold in order to determine peak values;
    determining common peak values substantially corresponding to similar locations within the half radio frame, and
    identifying the PSS corresponding to said common peak positions.

2. The cell detection process according to claim 1 wherein said first and second PSS correlation measurement sequences are being respectively accumulated during a period corresponding to N half radio frames before being compared to said threshold.

3. The cell detection process according to claim 1 wherein said first and second PSS correlation measurements are performed consecutively in time.

4. The cell detection process according to claim 1 wherein said PSS correlation measurements are performed on the signal received from two distinctive antennas and that said first and second PSS correlation measurements are simultaneously performed on each streams received by one corresponding antenna.

5. The cell detection process according to claim 3 wherein said PSS correlation measurements are performed on the signal received from two distinctive antennas and that said first and second PSS correlation measurements are simultaneously performed on each streams received by one corresponding antenna, then followed by a third and fourth PSS correlation measurements performed in the next consecutive half radio frame, thus achieving PSS detection based on four distinctive measurements.

6. The cell detection process according to claim 1 wherein said PSS is carried by six resources blocks including 72 sub-carriers.

7. A receiver for a LTE telecommunication network comprising
    means for receiving signal samples transmitted by at least one Base Station (BS);
    means for performing a first Primary Synchronization Signal (PSS) correlation measurement with a predetermined PSS sequence in order to generate a first PSS correlation measurement sequence;
    means for performing a second Primary Synchronization Signal (PSS) correlation measurement in order to generate a second PSS correlation measurement sequence;
    means for comparing said first and second PSS correlation measurement sequences with a predetermined threshold in order to determine peak values;
    means for determining common peak values substantially corresponding to similar locations within the half radio frame, and
    means for identifying the PSS corresponding to said common peak positions.

8. The receiver according to claim 7 further comprising:
means for accumulating the sequences of said first and second correlation measurement during a period corresponding to N half radio frames before being compared to said threshold.

9. The receiver according to claim 7 further comprising:
means for performing successively said first and second PSS correlation measurements on a single signal.

10. The receiver according to claim 7 further comprising:
two antennas; and
means for performing simultaneously correlation measurements of the signals received from each antenna in order to compute said first and said second correlation measurement sequences.

11. The receiver according to claim 10 further comprising:
means for performing, further to the computation of said first and second PSS correlation measurements sequences, the computation of a third and a fourth PSS correlation measurements performed in the next consecutive half radio frame, thus achieving PSS detection based on four distinctive measurements.

12. The receiver according to claim 7 wherein
said PSS is carried by six resources blocks including 72 sub-carriers.

13. A mobile telephone comprising a receiver as defined by claim 7.

* * * * *